UNITED STATES PATENT OFFICE.

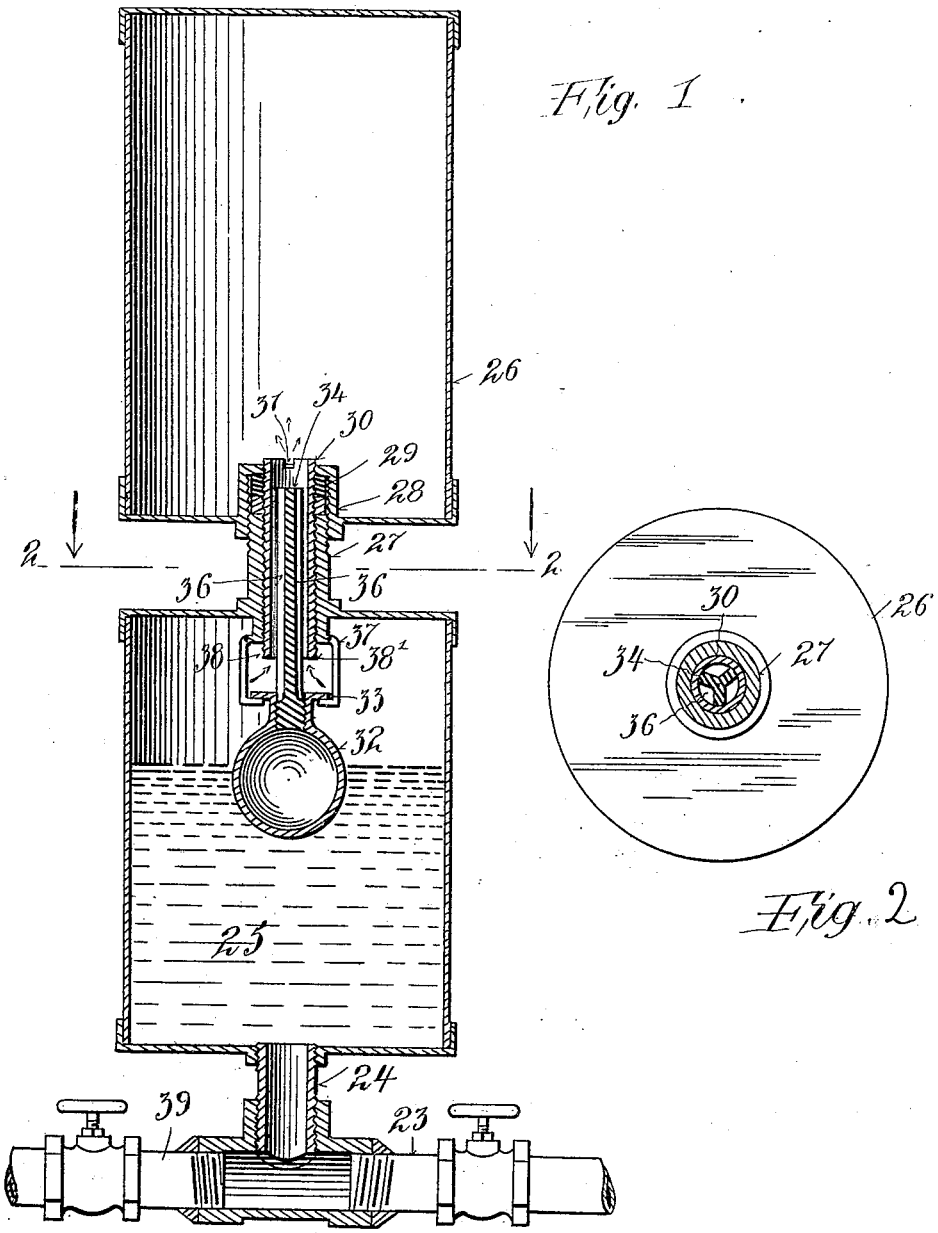

HENRY PEIN, OF JERSEY CITY, NEW JERSEY, ASSIGNOR, BY DIRECT AND MESNE ASSIGNMENTS, TO UNITED CENTADRINK MANUFACTURING COMPANY.

LIQUID-MEASURING APPARATUS.

No. 921,654.  Specification of Letters Patent.  Patented May 11, 1909.

Application filed May 13, 1904, Serial No. 207,869.  Renewed October 13, 1908.  Serial No. 457,530.

*To all whom it may concern:*

Be it known that I, HENRY PEIN, a citizen of the United States, and a resident of Jersey City, county of Hudson, and State of New Jersey, have invented certain new and useful Improvements in Liquid-Measuring Apparatus, of which the following is a specification.

The object of my invention is to provide a simple and efficient means for automatically measuring liquids by utilizing the chamber for the reception of liquid and a secondary compartment or chamber, to receive the air displaced by the liquid in the former and to store it so as to be returned to the liquid chamber to replace the liquid when it is withdrawn. It has also a controlling valve interposed between the two chambers whereby the liquid is prevented from entering the air chamber.

Further objects of my invention and details of construction of one of its embodiments will be hereinafter described.

Referring to the drawings—Figure 1 is a vertical section through the measuring cup, and Fig. 2 is a cross section on the line 2—2 of Fig. 1.

My invention is particularly adapted to automatic vending machines and especially for vending carbonated water, although it is also adapted for any other use wherein a measuring cup is necessary. Inasmuch as the measuring cup is adapted to be used with various kinds of machines, I will not describe the apparatus to which it is connected as this forms the subject matter of an application filed by me on the 9th day of December, 1904, and serially numbered 236,193, to which cross reference is made.

For the purpose of measuring the desired quantity of liquids to be dispensed with each operation of the valve and to regulate the quantity, I provide a measuring cup 25 in which the liquid may enter at the bottom, if desired, until it reaches a certain height, when it raises a floater provided near the top. It is my object to have the liquid which is forced into the measuring cup, displace the air or gas which was previously there and to provide a place for storing this excess air until the liquid is removed from the measuring cup, so that the air stored in the air chamber may take the place of the liquid and assist in forcing the liquid from the measuring cup. For this purpose I provide a second cup or chamber such as 26 preferably superimposed above the measuring cup, and connected to it by suitable means such as a screw threaded neck 27 with a corresponding screw threaded cup 28 on the upper chamber. Any suitable packing such as 29 may be used to form a hermetically sealed connection between the two chambers. In the neck 27 I provide a valve mechanism to govern the passage of air from one chamber to the other, and the specific means which I have shown, consists of a tube 30 screw threaded through the neck 27, and having a slot at the top such as 31, for adjusting by means of a screw driver or the like. This tube is adapted to be screwed up and down in the neck so that the floater hereinafter described may be adjusted to any desired height, thereby regulating the amount of liquid entering the measuring cup.

A floater such as 32 in the measuring cup is provided with a valve 33 and the spindle 34, the latter passing into the cylinder 30, and adapted to freely move vertically therein. The spindle is preferably made in the manner shown in Fig. 2, so that spaces 36 are allowed, for the passage of the air between the measuring cup and air chamber. As a means for holding the floater in its proper place, I preferably employ a set of fingers 37 which are secured by a nut or otherwise, to the cylinder 30 or in any other desired manner, so as to hold the floater in the proper place, as illustrated in Fig. 1. The lower end 38 of the tube 30 acts as a seat for the valve 33, and is preferably provided with a suitable packing as shown at 38.

The operation of the measuring cup is self-acting. The liquid enters through the pipes 23 and 24 into the measuring cup, the cock on the pipe 39 at the time being closed until it reaches the floater, when the latter is forced upwardly until the valve thereon is seated against the cylinder 30, and the liquid flow is stopped by reason of there being no further escape for the air or gas in the measuring cup to give room for more liquid. Before this takes place, of course, the air previously in the measuring cup is forced through the tube 30 into the upper chamber 26, and is there stored. When the liquid is drawn off through the pipe 39, at which time the pipe 23 is closed, the liquid gradually recedes, the floater drops into the position shown in Fig. 2, and the compressed air in the chamber 26 reënters the measuring cup, assists in forcing the liquid out of the latter, and takes the place of the liquid which is drawn off.

In the use of a measuring device for a carbonating machine it is necessary to prevent any outside air from entering into the mixture as the latter would then become a milky white and immediately lose its quality. Another difficulty heretofore found in measuring carbonated liquids has been that when the crowding of the liquid into a chamber until the top pressure prevents any further entry has been depended upon, the measurement has not been uniform, owing to the fact that the gas is not always the same in pressure. When the pressure is at different heights the liquid measured will vary. It is by overcoming these difficulties that my invention makes it possible to measure carbonated liquids uniformly and without affecting its quality.

Many changes may be made in the details of my invention without departing from the spirit of the broad claims hereinafter.

Having described my invention, what I claim is:—

1. A measuring device for liquids comprising a receptacle for a liquid, an air tight chamber; means whereby the air may be transmitted from one of said chambers to the other, and a valve adapted to control the passage between the said liquid and air chambers.

2. A means for measuring liquids, comprising a liquid receptacle, an air chamber adapted to receive the air displaced by the entry of liquid into said liquid receptacle, and a valve adapted to automatically cut off the egress of air from said first receptacle and to allow the reëntry of the stored air into the liquid chamber to take the place of the liquid when discharged.

3. In a liquid measuring device, the combination of a liquid receiving receptacle, an air tight chamber and an air valve between the liquid and air chambers adapted to be operated by said liquid.

4. In a device of the class described, the combination of a liquid receptacle, an air chamber connected therewith by an air valve, a floater operating said valve, adapted to be operated by the ingress and egress of liquid in the first mentioned receptacle whereby the air in the first mentioned receptacle will be forced into the air chamber, and said valve prevent the liquid from passing into the air chamber.

5. In a device of the class described, the combination of a liquid receptacle, means for governing the inflow and outflow of the liquid therein, an air chamber connected with said liquid receptacle, a valve connecting the two receptacles adapted to automatically cut off the passage of the air from one receptacle to the other, and means for adjusting said valve.

6. In a device of the class described, the combination of a liquid receptacle, an air chamber adapted to receive the air displaced by the liquid entering the liquid receptacle, a valve operated by said liquid, controlling the flow of air between the two receptacles, and means for adjusting the valve in relation to the height of said liquid.

7. In a device of the class described, the combination of a liquid receptacle, a superimposed air chamber adapted to receive the air displaced by the liquid in said chamber, a floater operated valve in the liquid chamber adapted to automatically govern the flow of air between the two chambers, and means for adjusting the said float valve in relation to the height of the said liquid.

8. In a device of the class described, the combination of a liquid receiving receptacle, a superimposed air chamber adapted to receive the air displaced by liquid entering the liquid chamber, a tube connecting the two chambers, a floater in the liquid chamber having a spindle moving in said tube, and means for opening and closing said tube.

9. In a device of the class described, the combination of a receptacle 25, an air chamber 26, connected therewith by a tube 30 vertically adjustable, and a floater 32 having a valve adapted to seat on the end of said tube.

10. In a device of the class described, the combination of a measuring receptacle for liquids, a valve operated by said liquid adapted to control the discharge of air displaced by liquid in the receptacle, and means for adjusting the height of said valve in relation to the said liquid.

Signed at the city, county and State of New York, this 29th day of March, 1904.

HENRY PEIN.

Witnesses:
SOPHIE SEKOSKY,
CHARLES G HENSLEY.